United States Patent
Usui

(10) Patent No.: US 12,203,891 B2
(45) Date of Patent: Jan. 21, 2025

(54) ACOUSTIC EMISSION INSPECTION SYSTEM FOR DETECTING ELASTIC WAVES IN INSPECTED OBJECTS

(71) Applicant: Kabushiki Kaisha Toshiba, Tokyo (JP)

(72) Inventor: Takashi Usui, Saitama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 420 days.

(21) Appl. No.: 17/653,504

(22) Filed: Mar. 4, 2022

(65) Prior Publication Data

US 2023/0082439 A1   Mar. 16, 2023

(30) Foreign Application Priority Data

Sep. 16, 2021   (JP) ................. 2021-151060

(51) Int. Cl.
  *G01N 29/14*   (2006.01)
  *G01N 29/04*   (2006.01)
  (Continued)

(52) U.S. Cl.
  CPC .......... *G01N 29/14* (2013.01); *G01N 29/041* (2013.01); *G01N 29/07* (2013.01); *G01N 29/223* (2013.01); *G01N 29/40* (2013.01); *G01N 29/42* (2013.01); *G01N 29/4463* (2013.01); *G01N 2291/0234* (2013.01); *G01N 2291/0421* (2013.01);
  (Continued)

(58) Field of Classification Search
  CPC ... G01N 2291/0234; G01N 2291/0421; G01N 2291/0422; G01N 2291/0423; G01N 2291/0427; G01N 2291/2626; G01N 29/041; G01N 29/043; G01N 29/07;
  (Continued)

(56) References Cited

U.S. PATENT DOCUMENTS 4,487,068 A   12/1984  Hawkins
2006/0201253 A1*  9/2006  Gonzales .............. G01N 29/11
                                                 73/643
(Continued)

FOREIGN PATENT DOCUMENTS

CN   104865316 A  *  8/2015  ............ G01N 29/06
CN   105004791 A  *  10/2015  ............ G01N 29/06
(Continued)

OTHER PUBLICATIONS

Vogt, Thesis: Determination of Material Properties using Guided Waves, Department of Mechanical Engineering Imperial College of Science, Technology and Medicine, 2002 (Year: 2002).*
(Continued)

*Primary Examiner* — David L Singer
(74) *Attorney, Agent, or Firm* — Oblon, McClelland, Maier & Neustadt, L.L.P.

(57) ABSTRACT

An inspection system includes one or more sensors. The one or more sensors detect second elastic waves emitted to the outside of a shaft-shaped inspection object due to first elastic waves propagating through the shaft-shaped inspection object. The one or more sensors are fixedly placed at positions away from the shaft-shaped inspection object and the directivity direction of the sensor is inclined at a predetermined angle with respect to an axial line of the shaft-shaped inspection object.

10 Claims, 12 Drawing Sheets

(51) Int. Cl.
*G01N 29/07* (2006.01)
*G01N 29/22* (2006.01)
*G01N 29/40* (2006.01)
*G01N 29/42* (2006.01)
*G01N 29/44* (2006.01)

(52) U.S. Cl.
CPC ............... *G01N 2291/0422* (2013.01); *G01N 2291/0423* (2013.01); *G01N 2291/0427* (2013.01); *G01N 2291/2626* (2013.01)

(58) Field of Classification Search
CPC .... G01N 29/14; G01N 29/223; G01N 29/348; G01N 29/40; G01N 29/42; G01N 29/4463
See application file for complete search history.

(56) References Cited

U.S. PATENT DOCUMENTS

| | | | |
|---|---|---|---|
| 2018/0031525 A1* | 2/2018 | Philtron | G01N 29/14 |
| 2020/0025720 A1* | 1/2020 | Quaegebeur | G01N 29/27 |
| 2021/0140302 A1* | 5/2021 | Sirevaag | G01V 1/46 |
| 2021/0285324 A1* | 9/2021 | Sirevaag | E21B 47/14 |

FOREIGN PATENT DOCUMENTS

| | | | | | |
|---|---|---|---|---|---|
| CN | 108896663 | A | * | 11/2018 | ............ G01N 29/11 |
| CN | 110045019 | A | * | 7/2019 | ............ G01N 29/041 |
| CN | 110361324 | A | * | 10/2019 | ............ G01N 19/04 |
| CN | 110554088 | A | * | 12/2019 | ............ G01N 29/043 |
| CN | 111089899 | A | * | 5/2020 | ............ G01N 29/041 |
| CN | 210742095 | U | * | 6/2020 | ............ G01N 19/04 |
| CN | 113109450 | A | | 7/2021 | |
| EP | 0995990 | A2 | * | 4/2000 | ............ G01N 29/041 |
| FR | 3098302 | A1 | * | 1/2021 | ............ G01M 13/045 |
| JP | 54-145588 | A | | 11/1979 | |
| JP | 54-147882 | A | | 11/1979 | |
| JP | S623901 | B2 | * | 1/1987 | ............ G01N 29/04 |
| JP | 9-210860 | A | | 8/1997 | |
| JP | 2004-93185 | A | | 3/2004 | |
| JP | 2008232825 | A | * | 10/2008 | ............ G01N 29/18 |
| JP | 2012-2507 | A | | 1/2012 | |
| JP | 2019194541 | A | * | 11/2019 | ............ G01N 29/04 |
| JP | 7183452 | B2 | | 12/2022 | |
| WO | WO 2019/081770 | A1 | | 5/2019 | |
| WO | WO-2019124237 | A1 | * | 6/2019 | ............ B21B 27/02 |
| WO | WO 2021/240817 | A1 | | 12/2021 | |

OTHER PUBLICATIONS

FBS, Inc. d.b.a., Guidedwave, Pipes—Guidedwave, retrieved from The Wayback Machine—webpage<https://web.archive.org/web/20191028160338/http://www.gwultrasonics.com:80/knowledge/pipe/> (Year: 2019).*

FBS, Inc. d.b.a., Guidedwave, Plates and Shells—Guidedwave, retrieved from The Wayback Machine—webpage<https://web.archive.org/web/20190831090023/https://www.gwultrasonics.com/knowledge/plateshell/> (Year: 2019).*

FBS, Inc. d.b.a., Guidedwave, Intro to Guided Waves—Guidedwave, retrieved from The Wayback Machine—webpage<https://web.archive.org/web/20190626201814/https://www.gwultrasonics.com/knowledge/gw-intro/> (Year: 2019).*

Hayashi et al, Guided wave dispersion curves for a bar with an arbitrary cross-section, a rod and rail example, Elsevier, Ultrasonics 41 (2003) 175-183, (Year: 2003).*

Mijarez et al, Experiments and modelling of guided wave propagation in a multiple-wire cable, 18th World Conference on Nondestructive Testing, Apr. 16-20, 2012, Durban, South Africa (Year: 2012).*

Adalarasu et al, Contrasting features of Guided Waves and its impact on Flaw Detection, National Seminar & Exhibition on Non-Destructive Evaluation, NDE 2014, Pune, Dec. 4-6, 2014. (Year: 2014).*

Lowa State University Center for Nondestructive Evaluation, Refraction and Snell's Law, retrieved from The Wayback Machine—webpage<https://web.archive.org/web/20210518163338/https://www.nde-ed.org/Physics/Waves/refractionsnells.xhtml> (Year: 2021.*

A.E.H. Love, A Treatise on the Mathematical Theory of Elasticity, Cambridge University Press, 1926, pp. 238-280 and cover page.

Japanese Office Action issued Jul. 23, 2024 in Japanese Application 2021-151060, (with unedited computer-generated English translation), 5 pages.

* cited by examiner

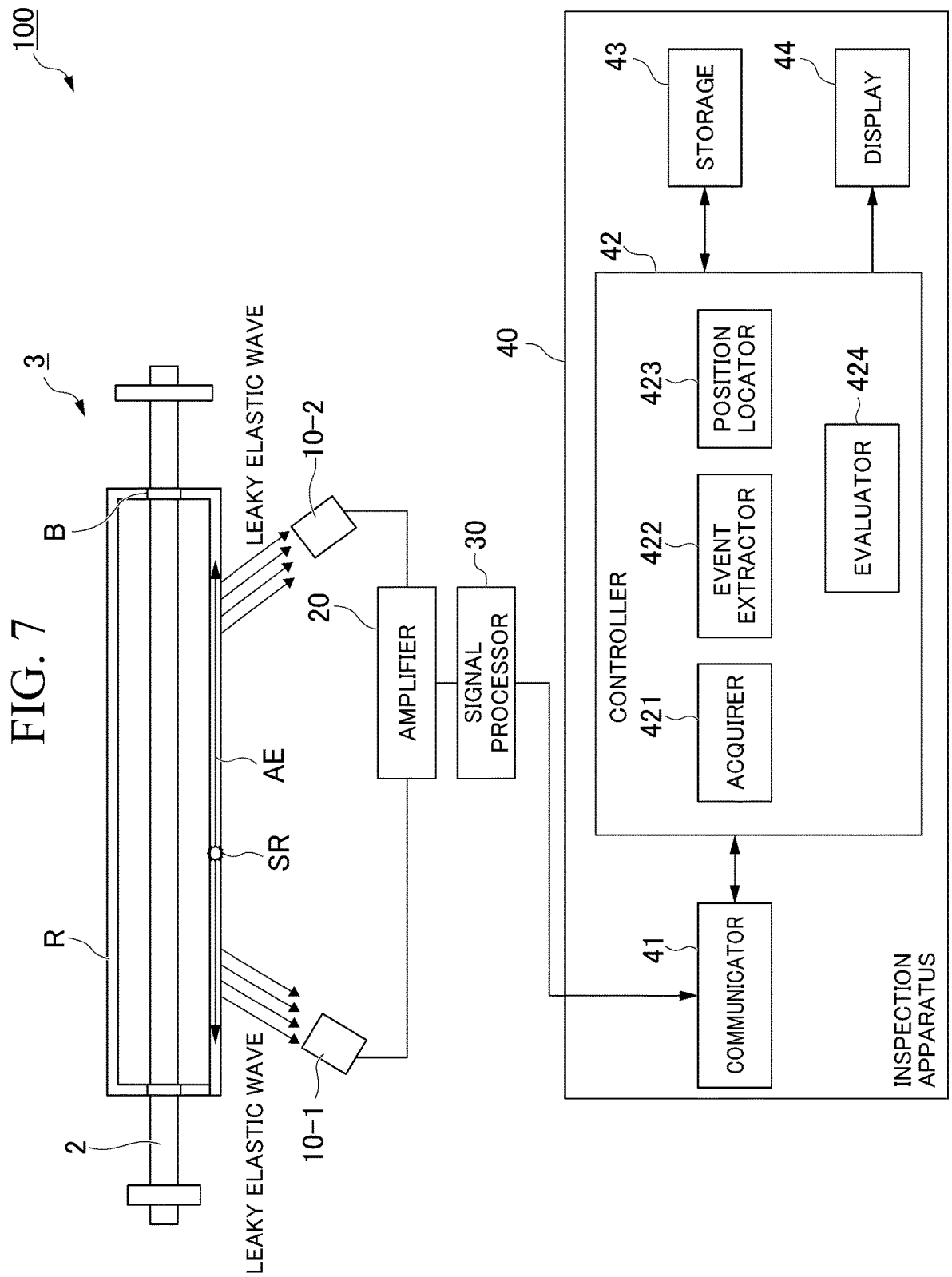

ACOUSTIC EMISSION INSPECTION SYSTEM FOR DETECTING ELASTIC WAVES IN INSPECTED OBJECTS

CROSS-REFERENCE TO RELATED APPLICATION

This application is based upon and claims the benefit of priority from Japanese Patent Application No. 2021-151060, filed Sep. 16, 2021; the entire contents of which are incorporated herein by reference.

FIELD

Embodiments described herein relate generally to an acoustic inspection system and an inspection method using acoustic emission techniques.

BACKGROUND

A so-called non-destructive inspection technology for detecting damage to a mechanical device and a structure without destroying a structure to be inspected (inspection object) is known. With the development of information technology in recent years, particularly, there has been an increasing demand for so-called monitoring technologies for detecting damage while operating the original functions of a mechanical device. As one of these, a technology for detecting damage to a mechanical device promptly by an acoustic emission AE) method for detecting elastic waves, which are generated by the generation, growth, rubbing, and the like of cracks, using a high-sensitivity sensor, is known.

However, in the related art, the sensor needs to be disposed in contact with an inspection object and it may not be possible to detect damage while maintaining the functions of the mechanical device. For example, the related art may not be applicable to shaft-shaped inspection objects such as rotary shafts and rollers. Such a problem is not limited to a case of detecting elastic waves generated in shaft-shaped inspection objects and is a problem common to all cases of detecting elastic waves propagating through shaft-shaped inspection objects.

BRIEF DESCRIPTION OF THE DRAWINGS

FIG. 7 is a diagram showing the configuration of an inspection system 100 in an embodiment.

DETAILED DESCRIPTION

Figure 1A:
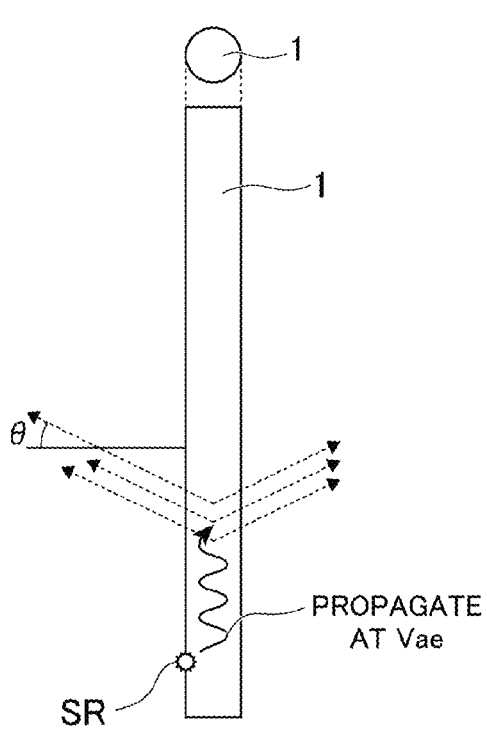
FIG. 1A is a showing an example of elastic waves AE propagating through the rod-shaped member.

The present invention provides a problem to be solved by the present invention is to provide an object of the present invention is to provide an inspection system and an inspection method, capable of accurately detecting elastic waves propagating through a shaft-shaped inspection object.

According to one embodiment, an inspection system of an embodiment includes one or more sensors. The one or more sensors detect second elastic waves emitted to the outside of a shaft-shaped inspection object due to first elastic waves propagating through the shaft-shaped inspection object. The one or more sensors are fixedly placed at positions away from the shaft-shaped inspection object and the directivity direction of the sensors is inclined at a predetermined angle with respect to an axial line of the shaft-shaped inspection object.

Hereinafter, an inspection system and an inspection method of an embodiment will be described with reference to the drawings.

Overview

An inspection system in an embodiment is a system that accurately detects elastic waves propagating through a shaft-shaped inspection object. In order to obtain such an effect, in the inspection system in the embodiment, one or more sensors, which are fixedly placed at positions away from the shaft-shaped inspection object, detect elastic waves (second elastic waves) emitted to the outside (for example, in the air or the sea) of the shaft-shaped inspection object due to elastic waves (first elastic waves) propagating through the shaft-shaped inspection object, the directivity direction of the sensors being inclined at a predetermined angle with respect to an axial line of the shaft-shaped inspection object. The shaft-shaped inspection object is a member having at least one of a solid structure having a diameter smaller than the wavelength of the elastic waves propagating through at least the shaft-shaped inspection object and a hollow structure having a thickness smaller than the wavelength of the elastic waves propagating through the shaft-shaped inspection object, and corresponds to one of the following 1) to 3).

1) A solid rotary shaft or a hollow rotary roller that rotates about a shaft
2) A guide roller provided to assist the movement of one or a plurality of guided members
3) A member that moves linearly along an axis (for example, a steel wire rope)

Next, the propagation of elastic waves in the shaft-shaped inspection object will be described. Elastic waves generated by cracks and the like with respect to an axis propagate with respect to the axis at a material-specific velocity. For example, as shown in the theory to be described below, elastic waves propagating in a round bar propagate at a predetermined velocity $v_{ae}$ depending on a material-specific value (for example, a velocity propagating inside a material-specific material) and a shape (for example, a shaft diameter). When focusing on a point on the surface of the material, it is displaced as the elastic waves propagate. This becomes a point sound source, and emits waves in the air according to the Huygens-Frennel principle. At this time, the velocity of waves propagating in the air is the velocity of sound in air ($v_{air}$=340.29 [m/s]).

Figure 1B:
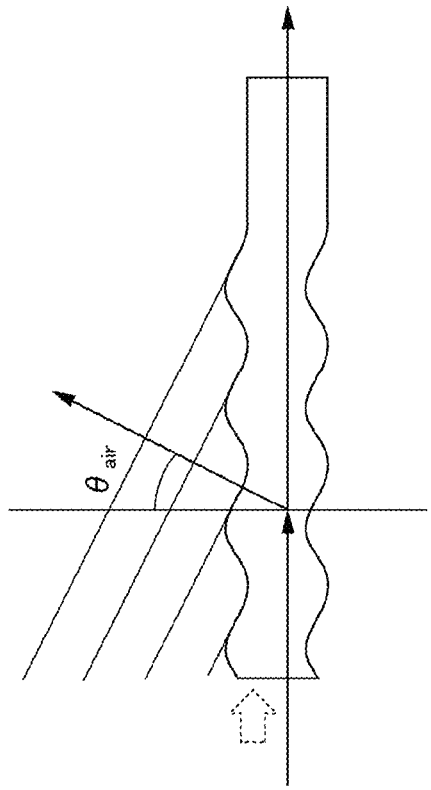
FIG. 1B is a showing an angle of the elastic waves emitted into the air.

FIGS. 1A and 1B area conceptual view of elastic waves propagating through a rod-shaped member 1. FIG. 1A shows an example of elastic waves AE propagating through the rod-shaped member 1, and FIG. 1B shows an angle of the elastic waves emitted into the air. When considering that a point sound source moves with the propagation of the elastic waves AE, the wavefront of the waves emitted into the air is inclined at an angle θ expressed by Equation (1) below with respect to a vertical direction.

$$\theta = \arcsin\left(\frac{v_{air}}{v_{ae}}\right) \tag{1}$$

Figure 2:
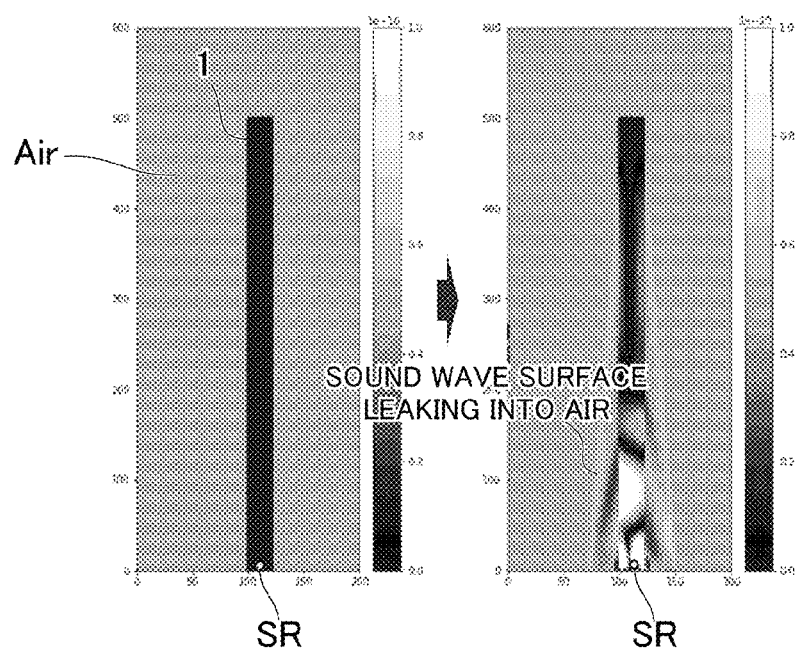
FIG. 2 is a view showing a result of simulating the wavefront of waves emitted into the air.

In Equation (1) above, $v_{ae}$ is calculated on the basis of the diameter of a material and the velocity of waves propagating inside the material as described above. Accordingly, when the velocity of the elastic waves propagating inside a shaft-shaped inspection object is known, it is possible to estimate an angle of the wavefront of the waves emitted into the air on the basis of Equation (1) above. A result of simulating the wavefront of the waves emitted into the air is shown in FIG. 2. In FIG. 2, a region indicated by Air represents the value of sound pressure, and reference numeral 1 represents the rod-shaped member. Inside the rod-shaped member, the value of a velocity is shown. In a state shown in the left figure of FIG. 2, when a minute vibration is applied at a position indicated by SR, it can be seen that the elastic waves are propagating as shown in the right figure of FIG. 2. Moreover, the right figure of FIG. 2 shows a sound wave surface leaking into the air.

Figure 3:
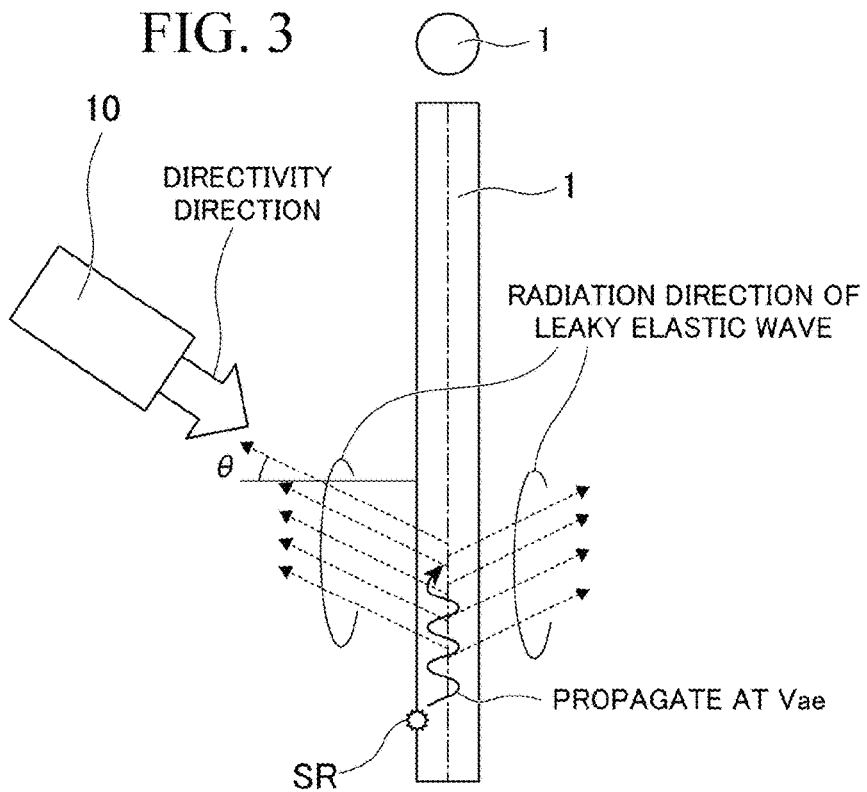
FIG. 3 is a view for explaining the arrangement of a sensor in an embodiment.

The sound waves surface leaking into the air can be detected by using a sensor 10 with high directivity. In FIG. 3, the rod-shaped member 1, which is an example of an inspection object, is used as an example in which the sound waves leaking into the air are detected by the sensor 10. The rod-shaped member 1 shown in FIG. 3 is a solid rotary shaft that rotates about a shaft. As shown in FIG. 3, the sound waves (second sound waves) emitted into the air can be detected with high sensitivity by aligning the angle of the wavefront obtained on the basis of Equation (1) above and the directivity direction of the sensor 10. Therefore, in the inspection system in the present embodiment, one or more sensors 10 are fixedly arranged at positions away from an inspection object, and the directivity direction of the one or more sensors 10 is inclined at the angle obtained on the basis of Equation (1) above with respect to the axial line of the inspection object, so that the angle of the wavefront and the directivity direction of the sensors 10 are aligned with each other. For example, the directivity direction of the one or more sensors 10 is inclined at a predetermined angle toward a central portion of the inspection object in a longitudinal direction. In a method for fixing the angle of the sensor 10, an actuator may be used or the angle may be fixed by other means. In the inspection system in the present embodiment, the directivity direction is inclined manually or automatically at the angle obtained on the basis of Equation (1) above.

The method described above is possible when the velocity of the elastic waves propagating inside the inspection object is known. On the other hand, the velocity of the elastic waves propagating inside the inspection object is not always known in all inspection objects. Therefore, when the velocity of the elastic waves propagating inside the inspection object is unknown, the velocity vector of elastic waves generated in a material can be detected from Equation (1) above by obtaining an angle that gives maximum detection sensitivity.

When considering the rotation of axes constituting the inspection object, handling differs depending on modes of the elastic waves. In an axisymmetric mode (L mode) in which the elastic waves propagate symmetrically with respect to an axis, leaky elastic waves are emitted radially with respect to a rotary shaft. Therefore, it is clear that the rotation of the axis does not affect a signal to be detected.

On the other hand, in an asymmetrical mode (F mode), propagation is asymmetric with respect to the rotary shaft. Therefore, when a rotation frequency $f_{axle}$ is regarded as sufficiently slower than a frequency $f_{ae}$ of elastic waves, the influence of the rotation of the axis can be ignored. For example, when there is a relationship shown in Equation (2) below, the elastic waves can be detected without detection being affected by the rotation of the axis. The fact that there is no influence of the rotation of the axis means that the influence of the rotation of the shaft is too small and may be ignored because the frequency of the elastic waves is much higher than that of the rotation of the axis.

$$\frac{f_{ae}}{f_{axle}} > 20 \tag{2}$$

Theoretical Background related to Propagation Velocity of Elastic Waves in Axis

A governing equation in the elastic wave theory is expressed by Equation (3) below when Lame constants, which are material-specific values, are λ, μ, displacement u, and time t.

$$(\lambda + \mu)\nabla(\nabla \cdot u) + \mu\nabla^2 u = \rho\frac{\partial^2 u}{\partial t^2} \tag{3}$$

Moreover, two wave equations of longitudinal waves and transverse waves expressed by Equation (4) below are derived by using Helmholtz's theorem.

$$\nabla^2 \Phi - \frac{1}{C_L^2}\frac{\partial^2}{\partial t^2}\Phi = 0 \tag{4}$$

$$\nabla^2 \Psi - \frac{1}{C_T^2}\nabla\frac{\partial^2}{\partial t^2}\Psi = 0$$

The respective velocities are expressed by Equation (5) below by the Lame constants.

$$C_T = \sqrt{\frac{\mu}{\rho}} = C_s \quad (5)$$

$$C_L = \sqrt{\frac{\lambda + 2\mu}{\rho}} = C_p$$

Moreover, when a material is a shaft with a diameter smaller than a wavelength, longitudinal waves and transverse waves are converted to each other at the boundary and composite waves satisfying predetermined phase conditions are observed as traveling waves with a certain wave number, resulting in a mode called guide waves. It is known that when the shape is a round bar, an exact solution expressed by Equation (6) below can be derived for elastic waves propagating inside the round bar.

$$\frac{2p}{a}(q^2 + k^2)J_1(pa)J_1(qa) - \quad (6)$$

$$(q^2 - k^2)J_0(pa)J_1(qa) - 4k^2pqJ_1(pa)J_0(qa) = 0$$

$$\begin{bmatrix} \text{ここで} \\ p = \sqrt{\frac{\omega^2}{C_p} - k^2} \\ J_n(x): \text{Bessel Function of 1st Kind} \\ q = \sqrt{\frac{\omega^2}{C_s} - k^2} \\ k: \text{Wavenumber} \\ a: \text{Radius of Rod} \\ C_p: \text{Longitudinal Wave Velocity} \\ C_s: \text{Transverse Wave Velocity} \end{bmatrix}$$

The phase velocity $v_{phase}$ and the group velocity $v_{group}$ of the guide waves have a relationship expressed by Equation (7) below.

$$v_{phase} = \frac{\omega}{k} \quad (7)$$

$$v_{group} = \frac{\delta\omega}{\delta k}$$

Figure 4:
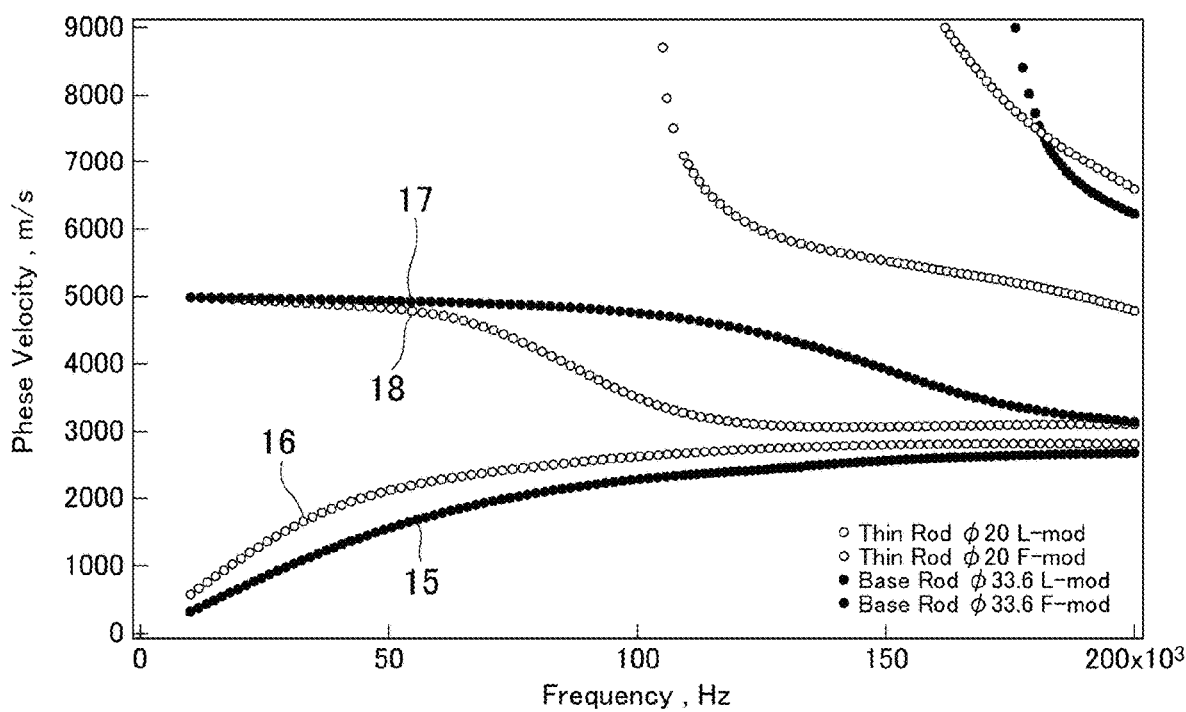
FIG. 4 is a view showing the relationship between the frequencies and the velocities of an L mode and an F mode in shaft diameters.

As a result of the above, the relationship between the frequency f and the velocities $v_{phase}$ and $v_{group}$ can be obtained. That is, the velocity can be obtained from the material-specific value and parameters and the frequency of the shape (in this case, the shaft diameter). An example of calculation of velocity dispersion is shown in FIG. 4. FIG. 4 shows the relationship between the frequencies and the velocities of the L mode and the F mode in shaft diameters (ϕ20 and ϕ33.6). The L mode represents an axisymmetric mode and the F mode represents a deflection mode (asymmetric mode). In FIG. 4, reference numeral 15 indicates the relationship between the frequency and the velocity of the F mode having the shaft diameter ϕ20, and reference numeral 16 indicates the relationship between the frequency and the velocity of the F mode having the shaft diameter ϕ33.6. In FIG. 4, reference numeral 17 indicates the relationship between the frequency and the velocity of the L mode having the shaft diameter ϕ20, and reference numeral 18 indicates the relationship between the frequency and the velocity of the L mode having the shaft diameter ϕ33.6.

FIG. 4 shows that the velocity of elastic waves can be specified by using the frequency (sensor resonance frequency) and the shaft diameter as prior information. As a consequence, even when the velocity of elastic waves propagating inside an inspection object is not known, it is possible to obtain an optimal sensor installation angle on the basis of Equation (1) above. A predetermined angle when the velocity of elastic waves is not known is obtained on the basis of the resonance frequency of the one or more sensors 10, a center frequency determined with integrated characteristics of an electric circuit, and the shaft diameter of the inspection object. The electric circuit is an electric circuit that processes an electric signal output from the sensor 10, and is, for example, a signal processor. The signal processor includes a bandpass filter that removes noise outside a measurement band. The bandpass filter has frequency characteristics of allowing a target frequency to pass therethrough and removing frequencies other than the target frequency. The sensor 10 generally has characteristics that sensitivity changes depending on the frequency. Particularly, the sensor 10 that detects vibration in the embodiment has frequency characteristics that sensitivity is maximum at a mechanical resonance frequency. A center frequency can be selected as the integrated characteristics of frequency characteristics A of the sensor 10 and frequency characteristics B of the bandpass filter. That is, a frequency to be observed can be selected by selecting the sensor 10 and the bandpass filter.

Next, a specific method for detecting elastic waves by a sensor will be described with reference to other specific examples of an inspection object.

First Example: When an Inspection Object is a Hollow Rotary Roller

Figure 5A:
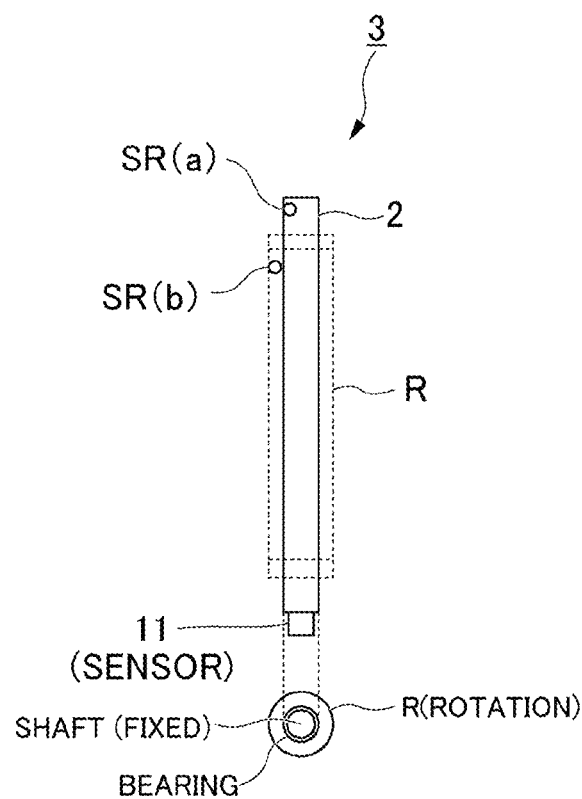
FIG. 5A is a view showing a problem of a sensor arrangement in the related art.

In FIG. 5, a member 3 including a roller R, a bearing, and a fixed shaft 2 will be described as an example. The roller R is a hollow rotary roller. The roller R is usually in contact with the fixed shaft 2 via the bearing. In general, when damage is detected by using a contact type sensor 11, the sensor 11 is installed on the fixed shaft 2 as shown in FIG. 5A. When a source is on the fixed shaft 2 as shown in SR(a) of FIG. 5A, elastic waves propagate on the fixed shaft 2 and reach the sensor 11 with a small amount of attenuation.

On the other hand, elastic waves generated on the roller R as indicated by SR(b) of FIG. 5 reach the sensor 11 from the fixed shaft 2 via the bearing. The bearing is in contact with a sphere such as a ball and a cylinder, or a curved surface, and has a structure that reduces a contact area. Therefore, the energy propagation of the elastic waves is hindered by passing through the bearing, so the elastic waves are extremely attenuated.

Figure 5B:
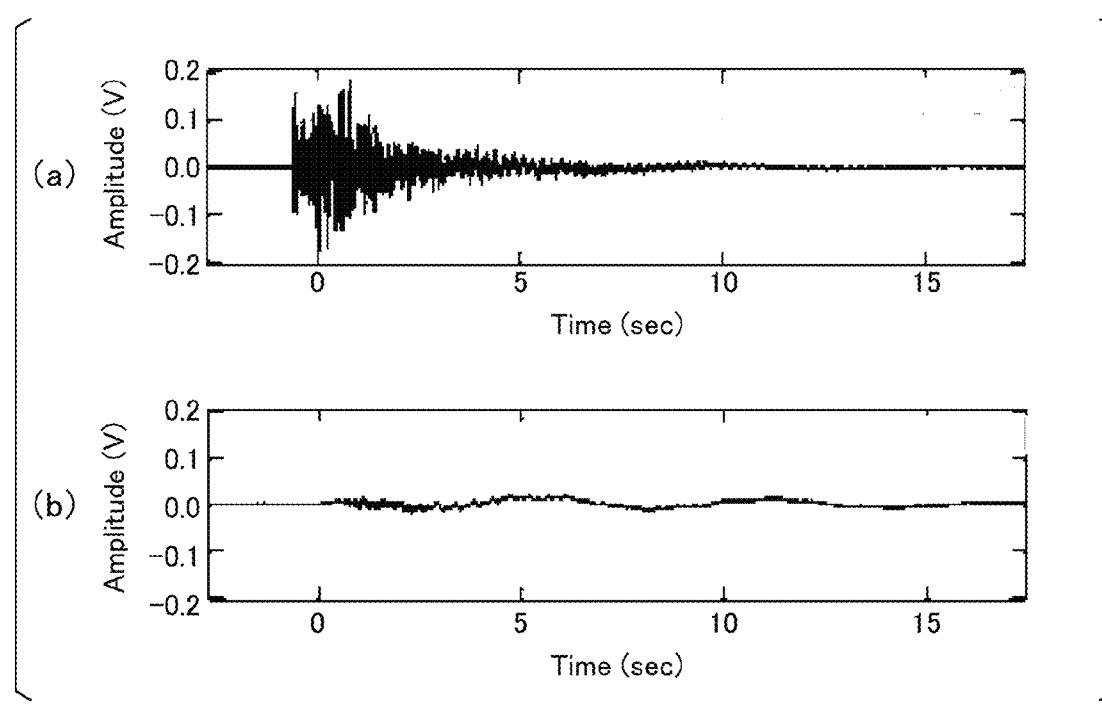
FIG. 5B is a view showing a signal when the sensor detects elastic waves.

FIG. 5B shows a signal when the sensor 11 detects elastic waves generated by using SR(a) and SR(b) as elastic wave sources. The upper figure (for example, (a) in FIG. 5B) of FIG. 5B represents elastic waves detected by the sensor 11 when a position indicated by SR(a) of FIG. 5A is the elastic wave source. The lower figure (for example, (b) in FIG. 5B) of FIG. 5B represents elastic waves detected by the sensor 11 when a position indicated by SR(b) of FIG. 5A is the elastic wave source. As apparent from FIG. 5B, it can be seen that the elastic waves generated on the roller R are extremely attenuated and hardly detected.

Figure 6A:
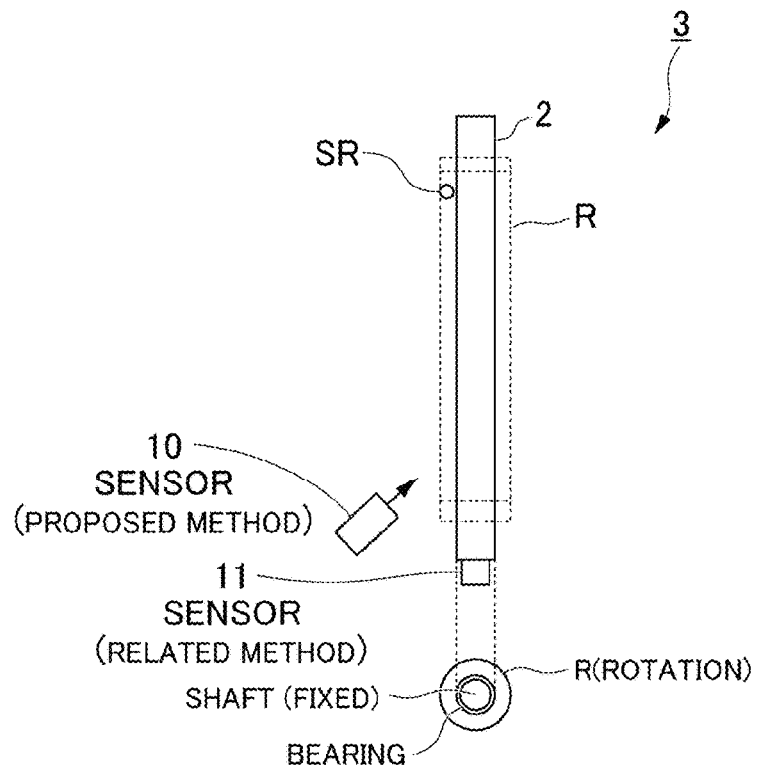
FIG. 6A is a view showing a sensor arrangement between the related method and the proposed method.

Therefore, a sensor arrangement for more accurately detecting the elastic waves generated on the roller R is shown in FIG. 6. FIG. 6A shows a sensor arrangement between the related method and the proposed method. In the related method, as shown in FIG. 5A, the sensor 11 is disposed on the fixed shaft 2. In the proposed method, as shown in FIG. 3, the sensor 10 is fixedly arranged so that the angle of the wavefront and the directivity direction of the sensor 10 are aligned with each other.

Figure 6B:
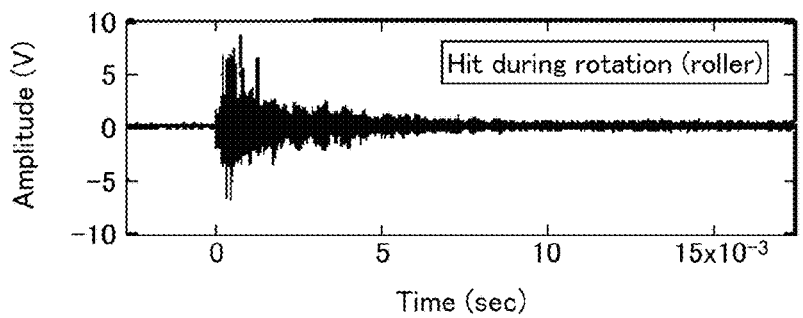
FIG. 6B is a view showing a signal detected by the sensor arranged by the proposed method.
Figure 6C:
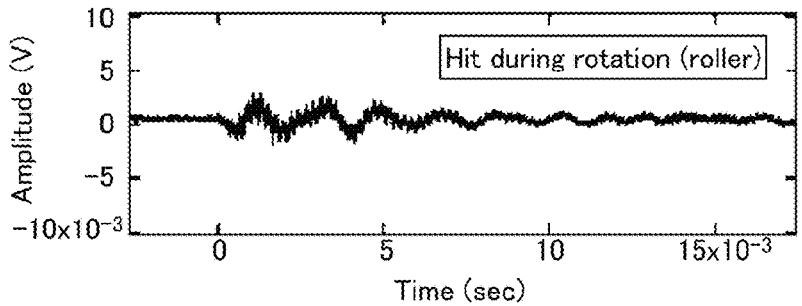
FIG. 6C is a view showing a signal detected by the sensor 11 arranged by the related method.

FIG. 6B shows a signal detected by the sensor 10 arranged by the proposed method and FIG. 6C shows a signal detected by the sensor 11 arranged by the related method. It can be seen that the proposed method can detect generated elastic waves with a higher signal-to-noise ratio (SN ratio) than the related method. In this way, in the sensor arrangement of the proposed method, elastic waves can be accurately detected even in the hollow rotary roller.

Two sensors 10-1 to 10-2 are arranged toward both ends of the shaft by using the sensor arrangement in the proposed method and the difference in arrival times of elastic waves to the sensors 10-1 to 10-2 is obtained, so that it is also possible to locate the position of a generation source of elastic waves (hereinafter, referred to as an "elastic wave source"). Hereinafter, the proposed method will be described.

Description of Specific Process in First Example

FIG. 7 is a diagram showing the configuration of an inspection system 100 in an embodiment. The inspection system 100 includes a plurality of sensors 10-1 to 10-*n* (n is an integer of 2 or more), an amplifier 20, a signal processor 30, and an inspection device 40. The sensors 10-1 to 10-*n* and the amplifier 20 are connected in a wired manner. The amplifier 20 and the signal processor 30 are connected in a wired manner. In FIG. 7, a case where the number of sensors 10 is two will be described as an example. In the following description, when the sensors 10-1 to 10-*n* are not particularly distinguished, they are simply written as sensors 10.

The sensors 10-1 to 10-2 are fixedly arranged at positions away from a member 3 in the vicinity of both ends of the member 3 so that the directivity directions thereof are inclined at a predetermined angle with respect to an axial line of an inspection object. For example, the sensors 10-1 to 10-2 are arranged so that the directivity directions thereof are inclined toward a central portion of the roller R in a longitudinal direction at the angle obtained on the basis of Equation (1) above. The sensors 10-1 to 10-2 detect elastic waves (leaky elastic waves shown in FIG. 7) emitted to the outside (for example, in the air) of the member 3 due to elastic waves AE propagating through the member 3. In FIG. 7, it is assumed that a position indicated by SR on the roller R is an elastic wave source. The elastic waves AE generated in the elastic wave source SR propagate the roller R and are emitted to the outside. The sensors 10-1 to 10-2 each convert the detected elastic waves into electric signals. B in the member 3 represents a bearing.

As the sensor 10, for example, a piezoelectric element having sensitivity in the range of 10 kHz to 1 MHz is used. An element more suitable for the sensor 10 is a piezoelectric element having sensitivity within the range of 100 kHz to 200 kHz. The sensor 10 may be of a type such as a resonance type having a resonance peak in a frequency range and a wide band type in which resonance is suppressed, but the sensor 10 may be of any type. A method in which the sensor 10 detects elastic waves includes a voltage output type method, a resistance change type method, a capacitance type method, and the like, but any detection method may be used. The sensor 10 may have an amplifier therein.

Instead of the sensor 10, an accelerator sensor may be used. In such a case, the accelerator sensor detects elastic waves emitted to the outside of the rod-shaped member 1 due to the elastic waves AE propagating through the rod-shaped member 1. The accelerator sensor converts the detected elastic waves into an electric signal by performing the same processing as the sensor 10.

The amplifier 20 amplifies the electric signal converted by each sensor 10. The amplifier 20 outputs the amplified electric signal to the signal processor 30.

The signal processor 30 receives the electric signal output from the amplifier 20. The signal processor 30 performs signal processing on the input electric signal. The signal processing performed by the signal processor 30 is, for example, noise removal, determination of arrival time, parameter extraction, and the like. The signal processor 30 outputs feature value data of the elastic waves obtained by the signal processing to the inspection device 40.

The signal processor 30 is configured by using an analog circuit or a digital circuit. The digital circuit is implemented by, for example, a field programmable gate array (FPGA) or a microcomputer. When a nonvolatile FPGA is used, power consumption during standby can be reduced. The digital circuit may also be implemented by a dedicated large-scale integration (LSI). The signal processor 30 may be provided with a nonvolatile memory such as a flash memory, and a removable memory.

The inspection device 40 inspects the rod-shaped member 1 by using the transmission data transmitted from the signal processor 30 for a predetermined period.

Figure 8:
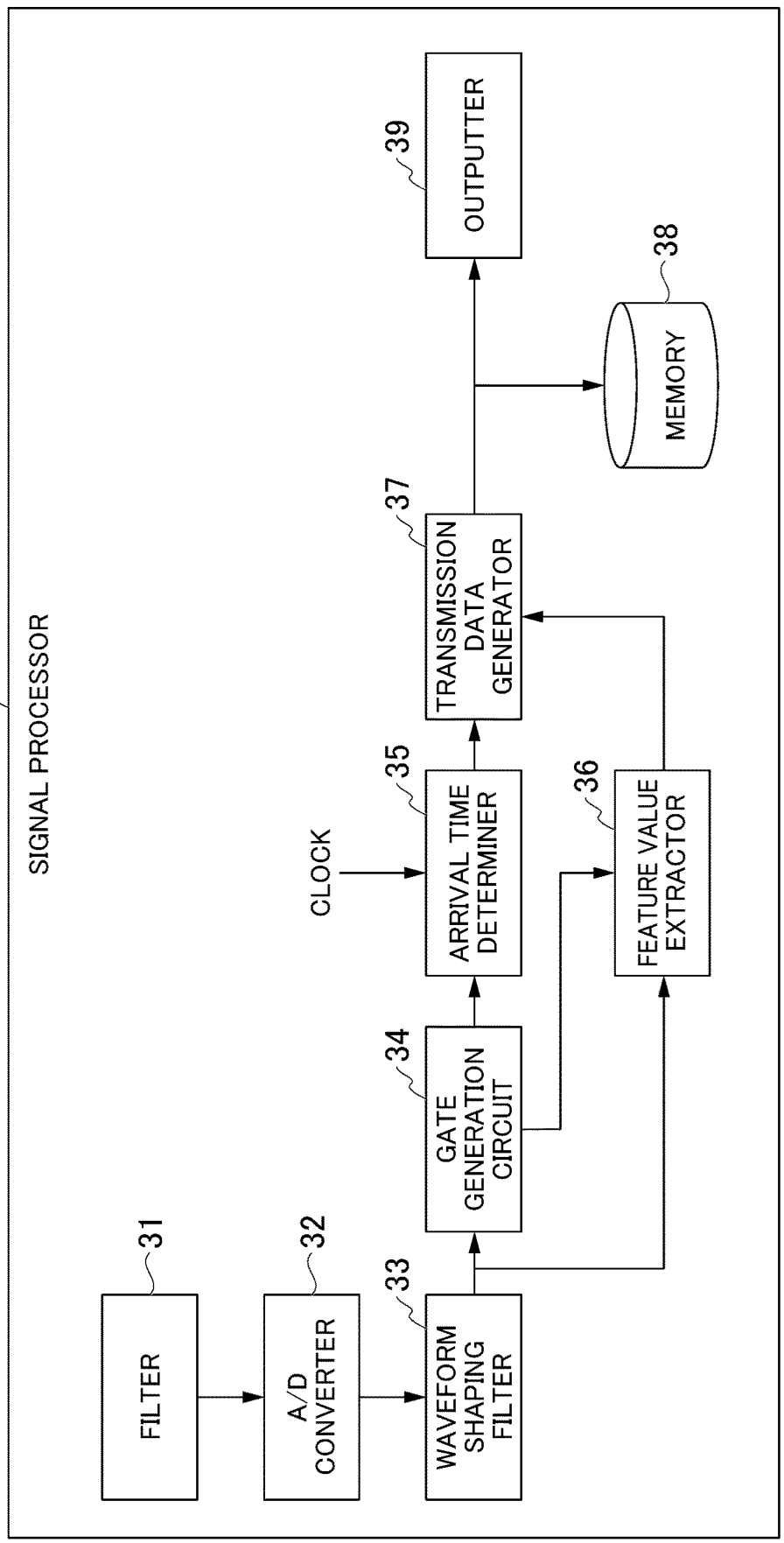
FIG. 8 is a schematic block diagram showing the function of a signal processor 30 in an embodiment.

FIG. 8 is a schematic block diagram showing the function of the signal processor 30 in an embodiment. The signal processor 30 includes a filter 31, an A/D converter 32, a waveform shaping filter 33, a gate generation circuit 34, an arrival time determiner 35, a feature value extractor 36, a transmission data generator 37, a memory 38, and an outputter 39.

The filter 31 removes a noise component outside a signal band from the electric signal output from the amplifier 20. The filter 31 is, for example, a bandpass filter (BPF). The filter 31 corresponds to the bandpass filter having the frequency characteristics B described above.

The A/D converter 32 quantizes the electric signal from which the noise component has been removed, and converts the quantized electric signal into a digital signal. The A/D converter 32 outputs the digital signal to the waveform shaping filter 33.

The waveform shaping filter 33 removes a noise component outside a predetermined signal band from a digital signal of input time-series data. The waveform shaping filter 33 is, for example, a bandpass filter (BPF). It is assumed that the waveform shaping filter 33 is set to allow the same frequency band as the filter 31 to pass therethrough, for example. The waveform shaping filter 33 outputs the signal after the noise component removal (hereinafter, referred to as a "noise removal signal") to the gate generation circuit 34 and the feature value extractor 36.

The gate generation circuit 34 receives the noise removal signal output from the waveform shaping filter 33. The gate generation circuit 34 generates a gate signal on the basis of the input noise removal signal. The gate signal is a signal indicating whether the waveform of the noise removal signal is sustained.

The gate generation circuit 34 is implemented by, for example, an envelope detector and a comparator. The envelope detector detects an envelope of the noise removal signal. The envelope is extracted by, for example, squaring the noise removal signal and performing predetermined processing (for example, processing using a low-pass filter or Hilbert transformation) on the squared output value. The comparator determines whether the envelope of the noise removal signal is equal to or greater than a predetermined threshold.

When the envelope of the noise removal signal is equal to or greater than the predetermined threshold, the gate generation circuit 34 outputs a first gate signal indicating that the waveform of the noise removal signal is sustained to the arrival time determiner 35 and the feature value extractor 36. On the other hand, when the envelope of the noise removal signal becomes less than the predetermined threshold, the gate generation circuit 34 outputs a second gate signal indicating that the waveform of the noise removal signal is not sustained to the arrival time determiner 35 and the feature value extractor 36.

The arrival time determiner 35 receives a clock output from a clock source such as a crystal oscillator (not illustrated) and the gate signal output from the gate generation circuit 34. The arrival time determiner 35 determines an elastic wave arrival time by using a clock input while the first gate signal is input. The arrival time determiner 35 outputs the determined elastic wave arrival time to the transmission data generator 37 as time information. The arrival time determiner 35 performs no processing while the second gate signal is input. The arrival time determiner 35 generates cumulative time information from the time when power is supplied, on the basis of the signal from the clock source. Specifically, the arrival time determiner 35 serves as a counter that counts an edge of the clock and uses the value of a register of the counter as time information. The register of the counter is determined to have a predetermined bit length.

The feature value extractor 36 receives the noise removal signal output from the waveform shaping filter 33 and the gate signal output from the gate generation circuit 34. The feature value extractor 36 extracts feature values of the noise removal signal by using the noise removal signal input while the first gate signal is input. The feature value extractor 36 performs no processing while the second gate signal is input. The feature values are information indicating the feature of the noise removal signal.

The feature values are, for example, the amplitude [mV] of a waveform, a rising time [usec] of the waveform, the duration [usec] of the gate signal, the number of zero cross counts [times], the energy [arb.] of the waveform, a frequency [Hz], root mean square (RMS) value, and the like. The feature value extractor 36 outputs parameters related to the extracted feature values to the transmission data generator 37. When outputting the parameters related to the feature values, the feature value extractor 36 correlates a sensor ID with the parameters related to the feature values. The sensor ID represents identification information for identifying the sensors 10 installed at the positions away from the inspection object. In this way, it is possible to specify whether the parameters related to the feature values is a feature value of elastic waves detected by which sensor 10.

The amplitude of the waveform is, for example, a value of a maximum amplitude in the noise removal signal. The rising time of the waveform is, for example, time TI until the noise removal signal reaches a maximum value from the start of the rising of the gate signal. The duration of the gate signal is, for example, the time until the amplitude becomes smaller than a preset value from the start of the rising of the gate signal. The number of zero cross counts is, for example, the number of times by which the noise removal signal crosses a reference line passing through a zero value.

The energy of the waveform is, for example, a time-integrated value of the square of the amplitude of the noise removal signal at each time point. The definition of the energy is not limited to the above example, and may be approximated by using, for example, an envelope of a waveform. The frequency is a frequency of the noise removal signal. The RMS value is, for example, a value obtained by square root of the amplitude of the noise removal signal at each time point.

The transmission data generator 37 receives the sensor ID, the time information, and the parameters related to the feature values. The transmission data generator 37 generates transmission data including the input sensor ID, time information, and parameters related to the feature values. The transmission data generator 37 may record the generated transmission data in the memory 38, or output the generated transmission data to the outputter 39 without recording it in the memory 38.

The memory 38 stores the transmission data. The memory 38 is, for example, a dual port random access memory (RAM).

The outputter 39 sequentially outputs, to the inspection device 40, the transmission data stored in the memory 38 or the transmission data output from the transmission data generator 37.

Returning to FIG. 7 and the description is continued.

The inspection device 40 includes a communicator 41, a controller 42, a storage 43, and a display 44.

The communicator 41 receives the transmission data output from the signal processor 30. The communicator 41 outputs the received transmission data to the controller 42.

The controller 42 controls the entire inspection device 40. The controller 42 is configured by using a processor such as a central processing unit (CPU), and a memory. The controller 42 serves as an acquirer 421, an event extractor 422, a position locating unit 423, and an evaluator 424 by executing a program.

Some or all of the function units of the acquirer 421, the event extractor 422, the position locating unit 423, and the evaluator 424 may be implemented by hardware (including circuit unit; circuitry) such as an application specific integrated circuit (ASIC), a programmable logic device (PLD), and an FPGA, or may be implemented by the cooperation of hardware and software. The program may be recorded on a computer readable recording medium. The computer readable recording medium is, for example, a non-transitory storage medium such as a portable medium such as a flexible disk, a magneto-optical disk, a ROM, and a CD-ROM, and a storage device such as a hard disk built in a computer system. The program may be transmitted via a telecommunication line.

Some of the functions of the acquirer 421, the event extractor 422, the position locating unit 423, and the evaluator 424 are not needed to be installed on the inspection device 40 in advance, and may be implemented by installing an additional application program in the inspection device 40.

The acquirer 421 acquires various information. For example, the acquirer 421 acquires the transmission data received by the communicator 41. The acquirer 421 stores the acquired transmission data in the storage 43.

The event extractor 422 extracts transmission data in one event from the transmission data stored in the storage 43. The event represents an elastic wave generation event that has occurred in the rod-shaped member 1. The elastic wave generation event in the present embodiment is damage in the rod-shaped member 1. When one-time event has occurred, elastic waves are detected by the plurality of sensors 10 at substantially the same time. That is, the storage 43 stores transmission data related to the elastic waves detected at substantially the same time. Therefore, the event extractor 422 provides a predetermined time window and extracts all transmission data, of which arrival time is present within the range of a time window, as transmission data in one event. The event extractor 422 outputs the extracted transmission data in one event to the position locating unit 423.

The range Tw of the time window may be determined by using an elastic wave propagation velocity v in a target carriage 1 and a maximum sensor interval dmax so as to be in the range of Tw≥dmax/v. In order to avoid erroneous detection, since it is desired to set Tw as a value as small as possible, Tw=dmax/v can be substantially obtained. The elastic wave propagation velocity v may be obtained in advance.

The event extractor 422 may extract the transmission data in one event by calculating similarity between parameters included in the transmission data. Specifically, the event extractor 422 sets transmission data, of which similarity is equal to or greater than the predetermined threshold, as data obtained from elastic waves generated from the same generation source. In calculating the similarity, for example, a standard Euclidean distance, a Minkowski distance, and a Mahalanobis distance may be used.

The position locating unit 423 locates the position of the elastic wave source on the basis of the sensor ID, the time information, and the sensor position information included in each of a plurality of transmission data in one event extracted by the event extractor 422. The sensor position information includes information on the installation position of the sensor 10 in correlation with the sensor ID.

The evaluator 424 evaluates the deterioration state of an inspection object or an object in contact with the inspection object on the basis of the locating result in the position locating unit 423. On the basis of the locating result, the evaluator 424 evaluates that there is damage in a region where the spatial density of the elastic wave source is equal to or greater than the predetermined threshold.

The storage 43 stores the transmission data and the sensor position information acquired by the acquirer 421. The storage 43 is configured by using a storage device such as a magnetic hard disk and a semiconductor storage device.

The display 44 displays information under the control of the controller 42. For example, the display 44 displays the specific result by the position locating unit 423. The display 44 is an image display device such as a liquid crystal display and an organic electroluminescence (EL) display. The display 44 may be an interface for connecting the image display device to the inspection device 40. In such a case, the display 44 generates a video signal for displaying the specific result, and outputs the video signal to the image display device connected to the display 44.

Figure 9:
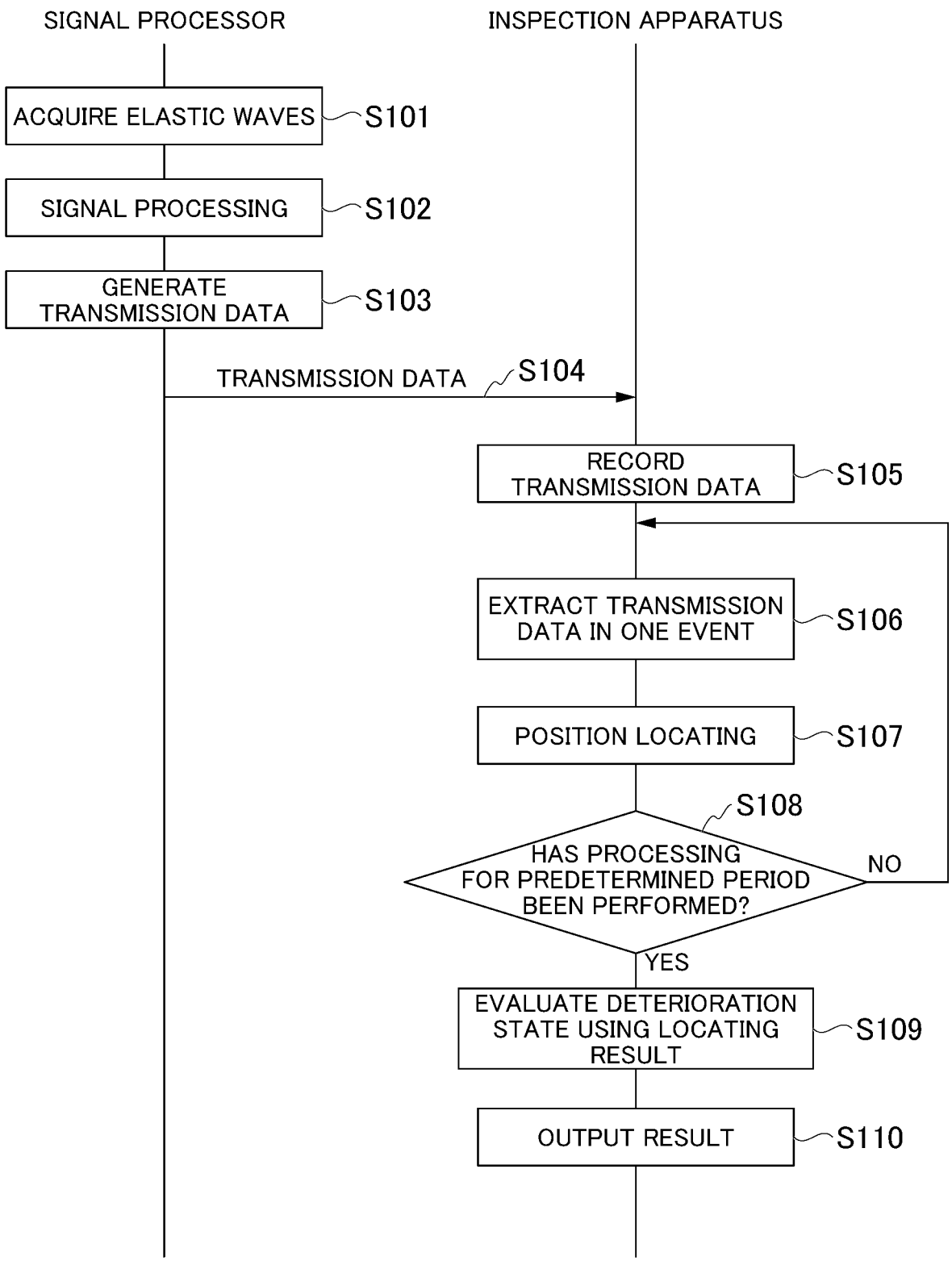
FIG. 9 is a sequence diagram showing a processing flow of the inspection system 100 in an embodiment.

FIG. 9 is a sequence diagram showing a processing flow of the inspection system 100 in an embodiment.

The sensors 10-1 to 10-2 detect elastic waves emitted to the outside of the rod-shaped member 1 due to elastic waves generated from damage occurring in the rod-shaped member 1. The sensors 10-1 to 10-2 convert the detected elastic waves into electric signals and output the electric signals to the amplifier 20. The signal processor 30 acquires the electric signals of the elastic waves amplified by the amplifier 20 (step S101). The signal processor 30 performs signal processing on each acquired electric signal (step S102). Specifically, the signal processor 30 performs signal processing such as noise removal, determination of arrival time, and parameter extraction on each electric signal. The signal processor 30 performs the above signal processing whenever the electric signals are obtained from the sensors 10.

The signal processor 30 generates transmission data for each sensor 10 by using data subjected to the signal processing (step S103). The signal processor 30 transmits the generated transmission data for each sensor 10 to the inspection device 40 (step S104). The signal processor 30 may transmit the transmission data to the inspection device 40 whenever the transmission data is generated, or may collectively transmit transmission data for a certain period to the inspection device 40 at the timing at which the transmission data have been generated.

The communicator 41 of the inspection device 40 receives the transmission data transmitted from the signal processor 30. The acquirer 421 acquires the transmission data received by the communicator 41. The acquirer 421 records the acquired transmission data in the storage 43 (step S105). The event extractor 422 extracts a plurality of transmission data in one event stored in the storage 43 (step S106). The event extractor 422 outputs the extracted transmission data in one event to the position locating unit 423.

The position locating unit 423 locates the position of the elastic wave source on the basis of the sensor ID, the time information, and the sensor position information included in each of the plurality of transmission data in one event extracted by the event extractor 422 (step S107). The position locating unit 423 outputs the locating result of the elastic wave source to the evaluator 424. The evaluator 424 determines whether processing for a predetermined period for obtaining the locating result required for evaluation has been performed (step S108). When the processing for the predetermined period has not been performed (NO in step S108), the event extractor 422 and the position locating unit 423 repeatedly perform the processes of step S106 and step S107.

On the other hand, when the processing for the predetermined period has been performed (YES in step S108), the evaluator 424 evaluates the deterioration state of the rod-shaped member 1 by using the locating result for the predetermined period (step S109). Specifically, the evaluator 424 evaluates that there is damage in a region where the spatial density of the elastic wave source is equal to or greater than the predetermined threshold. The evaluator 424 allows the display 44 to display the evaluation result (step S110).

Figure 10:
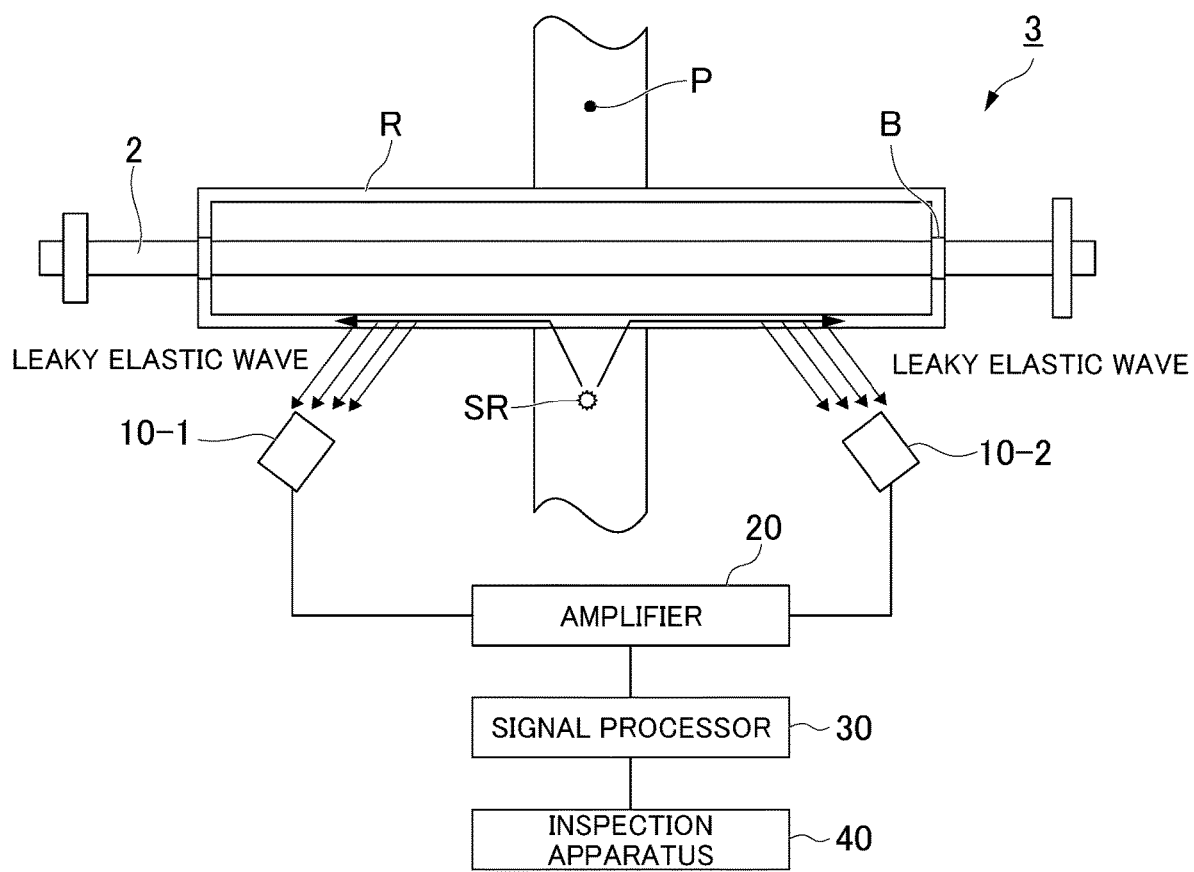
FIG. 10 is a view showing another example of an inspection object in an embodiment.

Second Example: When an Inspection Object is One Guided Member (One Conveyance Object) of which Movement is Assisted by the Roller R In the first example, the case where there is the elastic wave source on the roller R has been described as an example. In the second example, a case where the elastic wave source is not the roller R itself but is a conveyance object P (guided member) conveyed by the roller R as shown in FIG. 10 will be described. In the second example, the roller R is a solid rotary shaft or a hollow rotary roller that rotates about a shaft, and corresponds to a guide roller for assisting the movement of the conveyance object P. The conveyance object P conveyed by the roller R is, for example, a sheet conveyed in an image forming apparatus. The sheet may be torn or distorted during conveyance. The phenomenon that the sheet is torn or distorted during conveyance causes damage to the sheet, and elastic waves are generated in the sheet. The elastic waves (for example, elastic waves generated at the position of an elastic wave source SR in FIG. 10) generated in the conveyance object P propagate from the conveyance object P to the roller R and are emitted to the outside via the roller R as in the first example. The one or more sensors 10 detect elastic waves, which are generated by damage to the conveyance object P and propagate to the roller R, as first elastic waves, and detect elastic waves, which are emitted to the outside of the roller R, as second elastic waves. Since processes based on the elastic waves detected by the sensor 10 are the same as that described in the first example, a specific description of the processes will be omitted. The processes based on the elastic waves detected by the sensor 10 are processes performed by the amplifier 20, the signal processor 30, and the inspection device 40. In such a case, the inspection device 40 evaluates the deterioration state of the conveyance object P. In this way, the sensor arrangement of the proposed method in an embodiment can also be applied to detect elastic waves generated in a conveyance object conveyed by the roller R.

Figure 11:
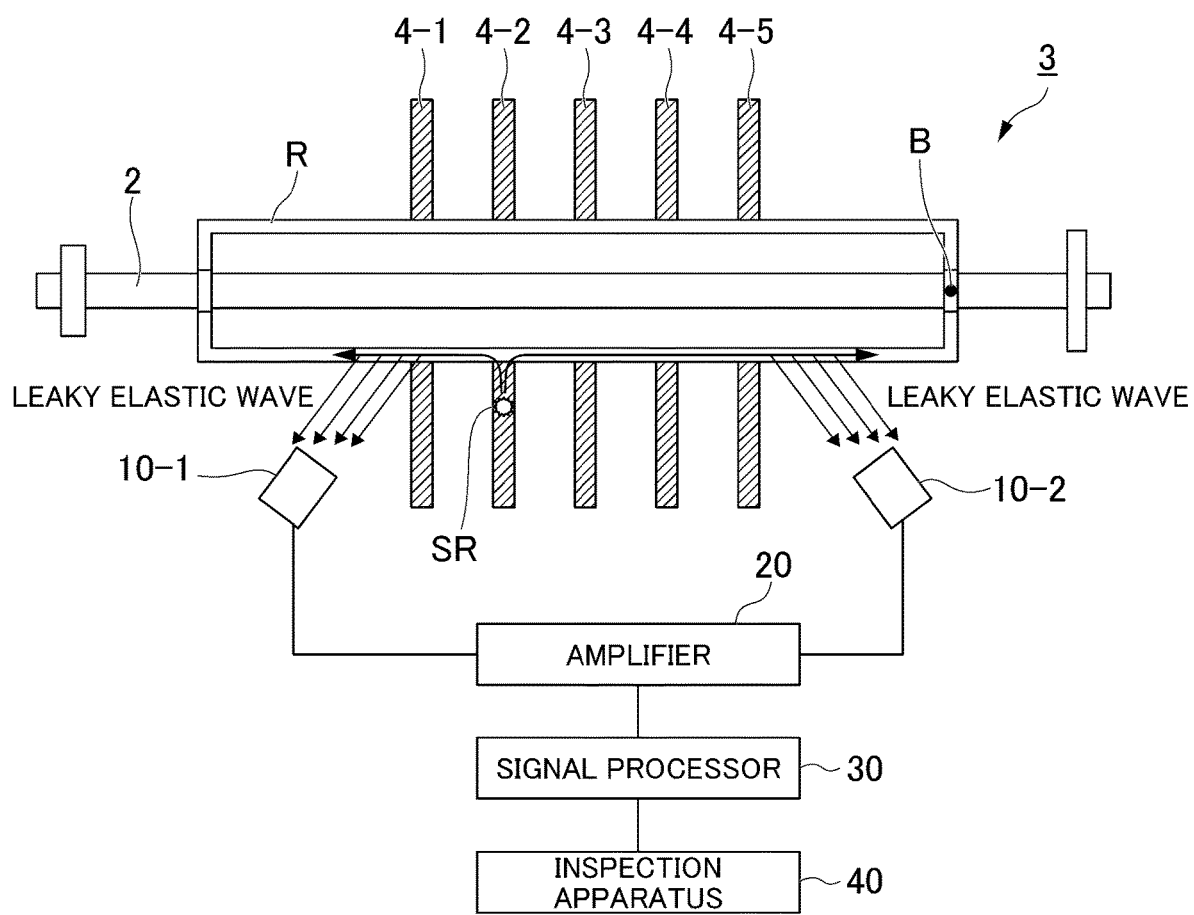
FIG. 11 is a view showing another example of an inspection object in an embodiment.

Third Example: When an Inspection Object is a Plurality of Guided Members (a Plurality of Conveyance Objects) of which Movement is Assisted by the Roller R In the third example, a case where the elastic wave source is not the roller R itself but is a plurality of conveyance objects 4-1 to 4-5 (guided members) conveyed by the roller R as shown in FIG. 11 will be described. In the third example, the roller R is a solid rotary shaft or a hollow rotary roller that rotates about a shaft, and corresponds to a guide roller for assisting the movement of the plurality of conveyance objects 4-1 to 4-5. The plurality of conveyance objects 4-1 to 4-5, which are conveyed by the roller R, are, for example, elevator ropes. In the elevator ropes, elastic waves are generated due to breakage. The elastic waves (for example, elastic waves generated at the position of an elastic wave source SR in FIG. 11) generated in any of plurality of conveyance objects 4-1 to 4-5 propagate from the plurality of conveyance objects 4-1 to 4-5 (for example the conveyance object 4-2) to the roller R and are emitted to the outside via the roller R as in the first example. The one or more sensors 10 detect elastic waves, which are generated by damage to any of the plurality of conveyance objects 4-1 to 4-5 and propagate to the roller R, as first elastic waves, and detect elastic waves, which are emitted to the outside of the roller R, as second elastic waves. Since processes based on the elastic waves detected by the sensor 10 are the same as that described in the first example, a specific description of the processes will be omitted. In such a case, the inspection device 40 evaluates the deterioration states of the plurality of conveyance objects 4-1 to 4-5. In the case of the third example, the position of the elastic wave source is located by using the difference in arrival times of elastic waves to the two sensors 10-1 to 10-2, so that it is possible to determine a conveyance object, in which the elastic waves are generated, among the plurality of conveyance objects 4-1 to 4-5. That is, in the case of the third example, an elastic wave source present in any of the plurality of conveyance objects 4-1 to 4-5 can be located by using the difference in the arrival times of the elastic waves to the two sensors 10-1 to 10-2.

Figure 12:
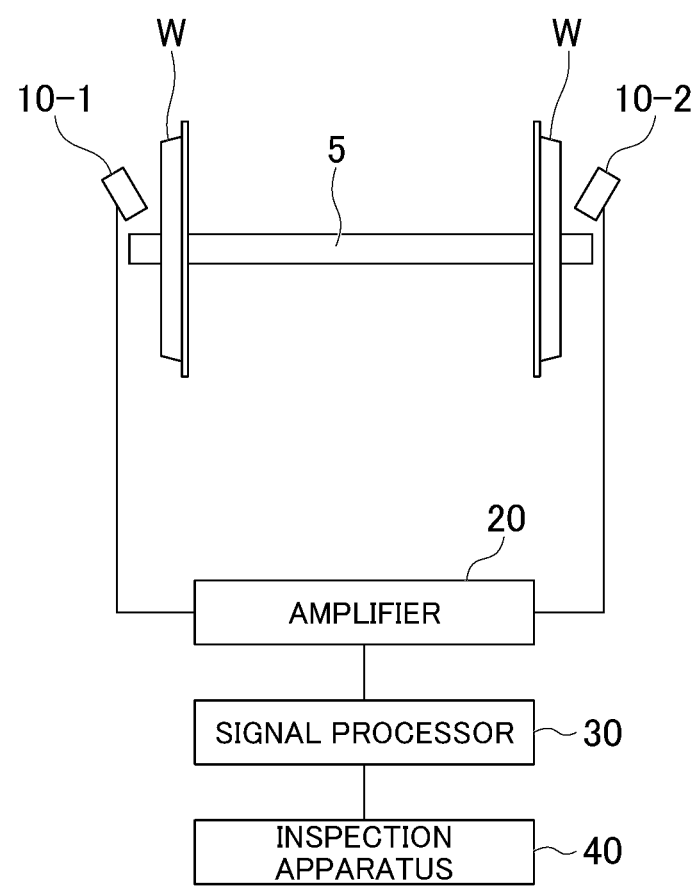
FIG. 12 is a view showing another example of an inspection object in an embodiment.

Fourth Example: When an Inspection Object is a Guide Roller Provided to Assist the Movement of One or a Plurality of Guided Members In the fourth example, a case where an inspection object is a guide roller provided to assist the movement of one or a plurality of guided members will be described. The guide roller provided to assist the movement of the guided members in the fourth example is, for example, an axle 5 that holds two vehicle wheels W as shown in FIG. 12. That is, in the fourth example, the axle 5 is an inspection object. Therefore, as shown in FIG. 12, in order to detect elastic waves generated on the axle 5, the sensors 10-1 to 10-2 are installed so as to have the angle based on Equation (1) above, respectively. The elastic waves generated on the axle 5 are emitted to the outside by propagating inside the axle 5. Since processes based on the elastic waves detected by the sensor 10 are the same as that described in the first example, a specific description of the processes will be omitted. In such a case, the inspection device 40 evaluates the deterioration state of the axle 5. FIG. 12 shows a configuration in which the axle 5 holds the two vehicle wheels W. However, the process shown in the fourth example can also be applied to a configuration in which the axle 5 holds one vehicle wheel (for example, a unicycle) and a configuration in which the axle 5 holds three or more vehicle wheels.

Figure 13A:
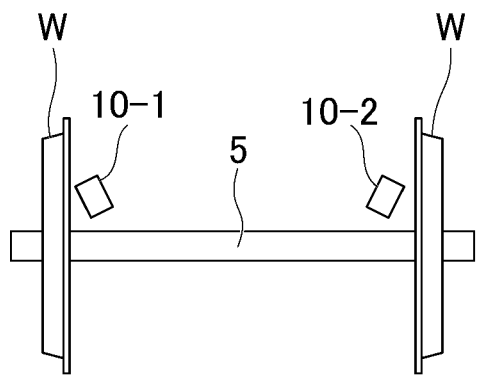
FIG. 13A is a view showing a variation in a sensor arrangement in the example shown in FIG. 12.
Figure 13B:
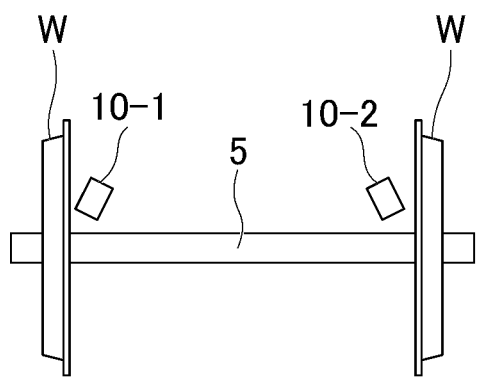
FIG. 13B is a view showing a variation in a sensor arrangement in the example shown in FIG. 12.

The sensor arrangement for detecting the elastic waves generated on the axle 5 is not limited to the arrangement shown in FIG. 12, and the sensors 10-1 to 10-2 may be arranged as shown in FIG. 13. FIG. 13 is a view showing a variation in the sensor arrangement in the example shown in FIG. 12. In the example shown in FIG. 12, each of the sensors 10-1 to 10-2 is arranged on the outer side of each vehicle wheel W, but in the example shown in FIG. 13, the sensors 10-1 to 10-2 are arranged between the two vehicle wheels W, respectively. Moreover, in FIG. 13A, the directivity direction of each of the sensors 10-1 to 10-2 is inclined at the angle based on Equation (1) above toward a central portion of the axle 5 in a longitudinal direction and disposed. On the other hand, in FIG. 13B, the directivity direction of each of the sensors 10-1 to 10-2 is inclined at the angle based on Equation (1) above toward each vehicle wheel W and disposed.

Figure 14:
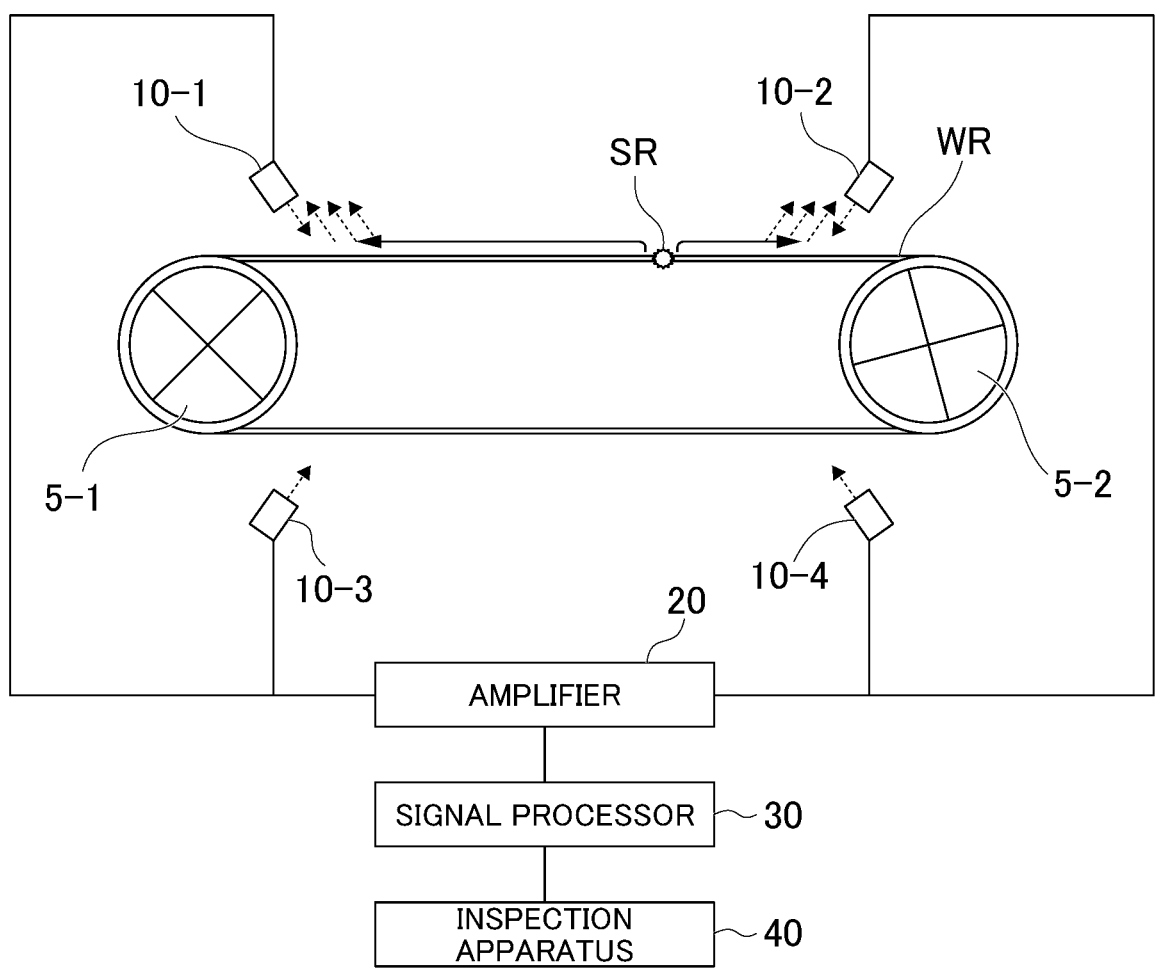
FIG. 14 is a view showing another example of an inspection object in an embodiment.

Fifth Example: When an Inspection Object is a Member that Moves Linearly Along an Axis In the fifth example, a case where an inspection object is a member that moves linearly along an axis will be described. The member that the inspection object moves linearly along an axis is, for example, a steel wire rope WR that moves linearly with respect to the sensor 10. In this way, the inspection system in an embodiment can also be configured to detect elastic waves generated by damage to a shaft-shaped member that linearly moves other than rotation. The steel wire rope WR is provided around a pulley 5-1 and a pulley 5-2. As shown in FIG. 14, for example, an elastic wave source can be accurately located by using four sensors 10-1 to 10-4. Since processes based on the elastic waves detected by the sensor 10 are the same as that described in the fifth example, a specific description of the processes will be omitted. In such a case, the inspection device 40 evaluates the deterioration state of the steel wire rope WR.

According to the inspection system configured as described above, elastic waves (second elastic waves), which are emitted to the outside (for example, in the air or the sea) of a shaft-shaped inspection object due to elastic waves (first elastic waves) propagating through the shaft-shaped inspection object, are detected by one or more sensors that are fixedly placed at positions away from the shaft-shaped inspection object, the directivity direction of the sensor being inclined at a predetermined angle with respect to an axial line of the shaft-shaped inspection object. With this, it is possible to accurately detect even elastic waves propagating through the shaft-shaped inspection object. As a consequence, it is also possible to locate the position of an elastic wave source based on the detected elastic waves and evaluate deterioration.

Hereinafter, a modification will be described.

In the aforementioned embodiment, the case where the outside of the shaft-shaped inspection object, to which elastic waves propagating through the shaft-shaped inspection object are emitted, is air has been described as an example; however, the medium surrounding the shaft-shaped inspection object is not limited to air. For example, the outside of the shaft-shaped inspection object, to which elastic waves propagating through the shaft-shaped inspection object are emitted, may be underwater. In the case of the above configuration, in Equation (1) above, $v_{air}$ is replaced with $v_{uw}$, $v_{uw}$ is, for example, 1,500 [m/s].

At least one embodiment described above includes one or more sensors that detect second elastic waves, which are emitted to the outside of a shaft-shaped inspection object due to first elastic waves propagating through the shaft-shaped inspection object, and has a configuration in which the one or more sensors are fixedly placed at positions away from the shaft-shaped inspection object and the directivity direction is inclined at a predetermined angle with respect to an axial line of the shaft-shaped inspection object, which makes it possible to accurately detect the elastic waves propagating through the shaft-shaped inspection object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection system comprising:
a shaft-shaped inspection object; and
one or more sensors configured to detect second elastic waves emitted to the outside of the shaft-shaped inspection object due to first elastic waves propagating through the shaft-shaped inspection object,
wherein the one or more sensors are fixedly placed at positions away from the shaft-shaped inspection object, a directivity direction of the one or more sensors being inclined at a predetermined angle with respect to an axial line of the shaft-shaped inspection object,
wherein the shaft-shaped inspection object is one or a plurality of guided members, a movement of the guided members being assisted by a guide roller, and
wherein the one or more sensors detect elastic waves, which are generated by damage to the guided member and propagate to the guide roller, as the first elastic waves, and detect elastic waves, which are emitted to the outside of the guide roller, as the second elastic waves.

2. The inspection system according to claim 1, wherein the directivity direction of the one or more sensors is inclined at a predetermined angle toward a central portion of the shaft-shaped inspection object in a longitudinal direction.

3. The inspection system according to claim 1, wherein the predetermined angle is expressed by Equation (1) below when a velocity of the second elastic waves is set as v and a velocity of the first elastic waves is set as $v_{ae}$, $$\theta = \arcsin\left(\frac{v}{v_{ae}}\right) \quad (1)$$

v in the above Equation (1) is a speed of sound $V_{air}$ in air or $V_{uw}$ in water.

4. The inspection system according to claim 1, wherein the predetermined angle is obtained on the basis of a resonance frequency of the one or more sensors, a center frequency determined with integrated characteristics of an electric circuit, and a shaft diameter of the shaft-shaped inspection object.

5. The inspection system according to claim 1, wherein the shaft-shaped inspection object has at least one of a solid structure having a diameter smaller than a wavelength of the first elastic waves and a hollow structure having a thickness smaller than the wavelength of the first elastic waves.

6. The inspection system according to claim 1, wherein the shaft-shaped inspection object is a solid rotary shaft or a hollow rotary roller that rotates about a shaft.

7. The inspection system according to claim 1, wherein the shaft-shaped inspection object is an object that moves linearly along an axis.

8. The inspection system according to claim 1, wherein the one or more sensors are a plurality of sensors, and
the inspection system further comprises:
a position locating unit configured to locate a position of a generation source of elastic waves generated on the shaft-shaped inspection object or an object in contact with the shaft-shaped inspection object, on the basis of the second elastic waves detected by each of the plurality of sensors.

9. The inspection system according to claim 8, further comprising:
an evaluator configured to evaluate a deterioration state of the shaft-shaped inspection object or an object in contact with the shaft-shaped inspection object on the basis of the position of the generation source of the elastic waves located by the position locating unit.

10. An inspection method comprising:
a step of locating a position of a generation source of first elastic waves generated on a shaft-shaped inspection object or an object in contact with the shaft-shaped inspection object, on the basis of second elastic waves that are emitted to the outside of the shaft-shaped inspection object due to first elastic waves propagating through the shaft-shaped inspection object and are detected by each of a plurality of sensors that are fixedly placed at positions away from the shaft-shaped inspection object, a directivity direction of the sensor being inclined at a predetermined angle with respect to an axial line of the shaft-shaped inspection object,
wherein the shaft-shaped inspection object is one or a plurality of guided members, a movement of the guided members being assisted by a guide roller that is a solid rotary shaft, and
wherein the plurality of sensors detect elastic waves, which are generated by damage to the guided member and propagate to the guide roller, as the first elastic waves, and detect elastic waves, which are emitted to the outside of the guide roller, as the second elastic waves.

* * * * *